United States Patent Office 3,426,030
Patented Feb. 4, 1969

3,426,030
4-TETRAHYDROPYRIDYLACRYLIC ACID DERIVATIVES
Vasken Paragamian, Dresher, Pa., assignor to McNeil Laboratories, Inc., a corporation of Pennsylvania
No Drawing. Continuation-in-part of application Ser. No. 441,351, Mar. 19, 1965. This application Oct. 21, 1966, Ser. No. 589,187
U.S. Cl. 260—295                                    5 Claims
Int. Cl. C07d 29/38; A61k 27/00

This is a continuation-in-part of my co-pending application Ser. No. 441,351, filed Mar. 19, 1965, now abandoned.

This invention relates to new chemical compounds having useful pharmacological properties in view of their hypotensive activity. More particularly, the invention relates to certain substituted 4-tetrahydropyridylacrylic acids and the corresponding lower alkyl esters thereof. These compounds may be structurally represented as follows:

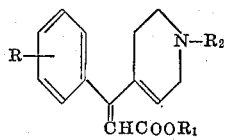

(I)

wherein R is a member selected from the group consisting of hydrogen, halo, lower alkyl, lower alkoxy and halo-lower alkyl, preferably trifluoromethyl; $R_1$ is a member selected from the group consisting of hydrogen and lower alkyl; and $R_2$ is a member selected from the group consisting of lower alkyl, phenyl-lower alkyl and substituted phenyl-lower alkyl. The pharmaceutically acceptable acid addition salts of (I) are also embraced within the scope of this invention.

As used herein, lower alkyl and lower alkoxy may be straight or branch chained and have from 1 to 7 carbon atoms, such as, for example, methyl, ethyl, propyl, isopropyl, butyl, tertiary-butyl, pentyl, hexyl, heptyl and the like, and the corresponding methoxy, ethoxy, propoxy, isopropoxy, butoxy, etc. The term halo stands for chloro, bromo, fluoro and iodo, preferably chloro and bromo.

Among the phenyl-lower alkyls that are operable herein are benzyl, phenethyl, γ-phenyl-n-propyl, 2-phenyl-butyl and the like. $R_2$ may also be a substituted phenyl-lower alkyl, i.e., a phenyl-lower alkyl wherein the phenyl moiety is mono- or poly-substituted with such groups as lower alkyl; lower alkoxy; halo; halo-lower alkyl, preferably trifluoromethyl; and the like.

The subject compounds (I) may be prepared by the Wittig transformation of an appropriate phenyl or substituted phenyl (i.e., R=hydrogen, halo, lower alkyl, lower alkoxy or halo-lower alkyl) 4-pyridyl ketone (II) with an appropriate tri-lower alkylphosphonoacetate such as, for example, tri-ethylphosphonoacetate, butyl di-ethyl-phosphonoacetate and the like, in an inert organic solvent such as ether, tetrahydrofuran, ethylene glycol dimethyl ether, benzene, xylene and the like in the presence of an alkali metal amide or hydride such as sodium amide, potassium amide, sodium hydride and the like. Elevated temperatures may be advantageously employed. The resulting acrylate (III) is then converted to its corresponding quaternary salt (IV) by conventional quaternization techniques, e.g., by reaction with $R_2X$, wherein $R_2$ is as defined heretofore and X is a halogen, such as chlorine, bromine or iodine, in typical solvents such as methanol, ethanol, isopropanol, benzene, acetone and the like. Conversion of (IV) to yield the subject ester compound (I-a), i.e., where $R_1$ is lower alkyl, is accomplished by treating (IV) with an alkali metal borohydride in, preferably, an alcoholic solvent such as methanol, ethanol, iso-propanol and the like. The subject compounds wherein $R_1$ is hydrogen (I-b) are readily obtained by either acid hydrolysis of the esters (I-a) with, for example, aqueous hydrochloric acid at elevated temperatures, or saponification of the esters (I-a) with aqueous alcoholic metal hydroxides, e.g., sodium hydroxide, potassium hydroxide, etc. The reaction schemes may be illustrated as follows:

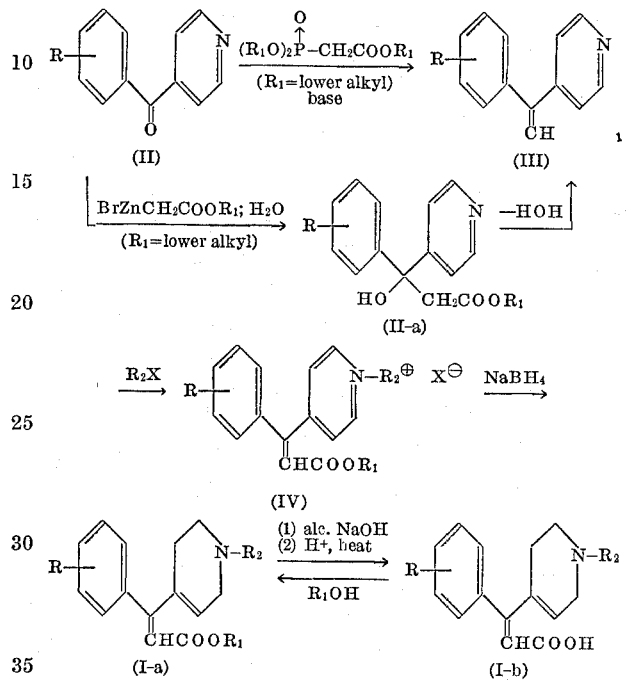

The acids (I-b) may also be used to prepare the corresponding lower alkyl esters (I-a) of this invention by conventional esterification techniques, such as by the reaction with an appropriate lower alkanol, preferably in the presence of an acidic catalyst. An alternative method of preparing (III) is by subjecting the starting ketone (II) to a Reformatsky reaction with an appropriate α-halo ester, e.g., a lower alkyl ester of α-bromo or α-chloro acetic acid, in the presence of activated zinc and anhydrous ether or ether-benzene, followed by hydrolysis. The product of the reaction is a β-hydroxy ester (II-a) which is then dehydrated to the α,β-unsaturated ester (III).

The starting ketones (II) may be conveniently prepared by interacting 4-pyridyllithium in ether solution with an appropriately R-substituted benzonitrile at temperatures preferably below room temperature. The reaction mixture is treated with dilute mineral acid, such as hydrochloric or sulfuric acid, and then made basic with an alkali such as sodium or potassium hydroxide. The organic layer is separated, dried and concentrated. The resulting ketone is obtained and purified by conventional techniques, e.g., if crystalline, by filtration and subsequent recrystallization from appropriate organic solvents, and, if liquid, by distillation procedures. Alternatively, several of the starting ketones may be obtained by interacting an appropriately R-substituted phenyllithium in ether solution with 4-cyanopyridine according to the same general procedure above.

The following compounds are representative of those contemplated by this invention and which may be prepared by the procedures discussed herein:

1,2,5,6-tetrahydro-1-ethyl-β-phenyl-4-pyridineacrylic acid;
1,2,5,6-tetrahydro-1-butyl-β-p-chlorophenyl-4-pyridine-acrylic acid;
1,2,5,6-tetrahydro-1-benzyl-β-o-methylphenyl-4-pyridine-acrylic acid;

1,2,5,6-tetrahydro-1-p-trifluoromethylbenzyl-β-phenyl-4-pyridineacrylic acid;
1,2,5,6-tetrahydro-1-phenethyl-β-phenyl-4-pyridineacrylic acid;
1,2,5,6-tetrahydro-1-methyl-β-p-trifluoromethylphenyl-4-pyridineacrylic acid;
1,2,5,6-tetrahydro-1-p-methoxybenzyl-β-phenyl-4-pyridineacrylic acid;
ethyl 1,2,5,6-tetrahydro-1-methyl-β-phenyl-4-pyridineacrylate;
methyl 1,2,5,6-tetrahydro-1-benzyl-β-p-methoxyphenyl-4-pyridineacrylate;
butyl 1,2,5,6-tetrahydro-1-methyl-β-p-trifluoromethylphenyl-4-pyridineacrylate;
ethyl 1,2,5,6-tetrahydro-1-o,p-dichlorobenzyl-β-phenyl-4-pyridineacrylate;
ethyl 1,2,5,6-tetrahydro-1-m-methylbenzyl-β-phenyl-4-pyridineacrylate;
the hydrochloride salt of ethyl 1,2,5,6-tetrahydro-1-methyl-β-phenyl-4-pyridineacrylate; and
the maleate salt of methyl 1,2,5,6-tetrahydro-1-benzyl-β-p-methoxyphenyl-4-pyridineacrylate.

Therapeutically active acid addition salts of (I) include those obtainable by reacting the base with an appropriate acid, as for example, an inorganic acid such as hydrochloric, sulfuric, phosphoric and the like acids, or an organic acid such as acetic, lactic, maleic, malonic, fumaric, benzoic, benezenesulfonic and the like acids.

The following examples are intended to illustrate, but not to limit the scope of the present invention.

EXAMPLE I

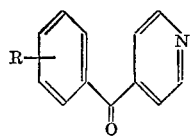

This example illustrates procedures for the prepartion of the above ketones, R being as described heretofore.

(A) To a solution of o-tolyl lithium (from 125 g. of o-bromotoluene and 10 g. of lithium) in ether is added 4-cyanopyridine (73 g.) at −20° C. The mixture is stirred for 0.5 hr., poured into dil. hydrochloric acid and then made basic with potassium hydroxide. The organic layer is separated, dried and concentrated. The residual oil is distilled to yield o-tolyl 4-pyridyl ketone, B.P. 170–172° C. (14 mm.).

(B) By following the general procedure of Example I-A, but utilizing equivalent quantities of bromobenzene, m-methoxy bromobenzene and p-trifluoromethyl bromobenzene, respectively, instead of o-bromotoluene, the following products are obtained: phenyl 4-pyridyl ketone, m-methoxyphenyl 4-pyridyl ketone and p-trifluoromethylphenyl 4-pyridyl ketone, respectively.

(C) By following the general procedure of Example I-A, but utilizing an equivalent quantity of 4-pyridyl lithium in lieu of the o-tolyl lithium therein, and utilizing an equivalent quantity of p-chloro benzonitrile in lieu of the 4-cyanopyridine therein, p-chlorophenyl 4-pyridyl ketone is obtained as the product.

EXAMPLE II (A) Ethyl β-phenyl-4-pyridineacrylate.—To a 15 g. (52% on mineral oil) suspension of sodium hydride in 400 ml. of dry ethyleneglycol dimethyl ether (monoglyme) is added a monoglyme solution of 80 g. (0.35 mole) of triethylphosphonoacetate and the resulting solution is stirred at room temperature for 1½ hrs. A monoglyme solution of phenyl 4-pyridyl ketone is then added and the entire mixture is refluxed for 3 hrs., concentrated to ½ its volume and diluted with chloroform. The chloroform solution is washed repeatedly with water and dried. Removal of the solvent and recrystallization of the residual solid form heptane gives 62 g. (68% yield) of the product, white needles, M.P. 97–98° C.

(B) The procedure of Example II–A is followed except that an equivalent quantity of o-tolyl 4-pyridyl ketone, m-methoxyphenyl 4-pyridyl ketone, p-trifluoromethylphenyl 4-pyridyl ketone and p-chlorophenyl 4-pyridyl ketone, respectively, is used in lieu of the phenyl 4-pyridyl ketone therein to yield, as respective products, the following: ethyl β-(o-tolyl)-4-pyridineacrylate, ethyl β-(m-methoxyphenyl)-4-pyridineacrylate, ethyl β-(p-trifluoromethylphenyl)-4-pyridineacrylate and ethyl β-(p-chlorophenyl)-4-pyridineacrylate.

EXAMPLE III (A) 4 - [(β - carbethoxy-α-phenyl)vinyl]-1-methylpyridinium iodide.—To a solution of 8 g. of ethyl β-phenyl-4-pyridineacrylate in 50 ml. of methanol is added excess methyl iodide and the resulting solution is refluxed for 1.5 hrs. The solution is then reduced to ⅓ its volume. Addition of ether separates the instant quaternary salt. Two recrystallizations from methanol-ether give a yellow solid, M.P. 181–182.5° C.

Analysis.—Calcd. for $C_{16}H_{15}NO_2 \cdot CH_3I$: N, 3.56%. Found: N, 3.40%.

(B) By substituting other $R_2$ halides, e.g., ethyl iodide, propyl bromide, benzyl chloride, o-methylbenzyl chloride, p-methoxybenzyl chloride, o,p-dichlorobenzyl chloride and p-trifluoromethylbenzyl chloride for the methyl iodide in Example III–A, the corresponding quaternary salts of ethyl β-phenyl-4-pyridineacrylate are obtained.

(C) The procedure of Example III–A is followed except that an equivalent quantity of the respective esters of Example II–B is used instead of the ethyl β-phenyl-4-pyridineacrylate of Example III–A to yield the corresponding methyl iodide quaternary salts thereof.

EXAMPLE IV (A) Ethyl 1,2,5,6 - tetrahydro-1-methyl - β - phenyl-4-pyridineacrylate.—To a solution of 9 g. (0.023 mole) of 4-[(β - carbethoxy-α-phenyl)vinyl] - 1 - methylpyridinium iodide in 150 ml. of methanol is added 3.5 g. of sodium borohydride over a period of 10 min. After the addition is complete, the resulting solution is stirred for 1 hr. at room temperature and concentrated to ½ its volume, diluted with ether and washed with water. Drying and removal of the solvents affords 5.9 g. of a light yellow oil, ethyl 1,2,5,6-tetrahydro-1-methyl - β - phenyl-4-pyridineacrylate. The hydrochloride salt is prepared in ether and recrystallized twice from ethanol-ether to give a white solid, M.P. 175–176° C.

Analysis.—Calcd. for $C_{17}H_{21}NO_2 \cdot HCl$: N, 4.55%. Found: N, 4.25%.

(B) By substituting an equivalent quantity of the quaternary salts of Examples III–B and III–C for the quaternary salt of Example IV–A, the corresponding ethyl 1,2,5,6-tetrahydro-1-$R_2$ - β - (R-phenyl)-4-pyridineacrylates and hydrochloride salts thereof are obtained.

EXAMPLE V (A) 1,2,5,6 - tetrahydro-1-methyl-β-phenyl-4-pyridineacrylic acid is prepared from the corresponding ethyl acrylate of Example IV–A by reaction with aqueous hydrochloric acid at elevated temperatures, or alternatively, by reaction with one equivalent of an alkali metal hydroxide such as, sodium or potassium hydroxide in aqueous alcohol, followed by acidification with a strong acid such as, hydrochloric or sulfuric acid.

(B) The esters of Example IV–B are similarly converted to their corresponding acid form by following the procedures of Example V–A.

The novel compounds herein possess valuable hypotensive properties for use in the therapy and relief of hypertension. A lowering of blood pressure is observed, without deleterious side effects, when the compounds are administered to laboratory animals in either oral or parenteral pharmaceutical forms. As exemplified with ethyl 1,2,5,6-tetrahydro-1-methyl - β - phenyl-4-pyridineacrylate hydrochloride, one of the preferred species herein, progressive hypotension is oserved when administered intravenously to anesthetized dogs beginning at a dose level of 2.0 mg./kg. A dose of 50 mg./kg., intraduodenally, produced a maximum fall in blood pressure (60 mm. Hg) after 15 minutes; duration 3 hours; respiration steady. In a fasted anesthetized dog, a 28% decrease in blood pressure was observed 2 hours after administration of 50 mg./kg., intraduodenally.

The subject compounds, in view of their effectiveness orally and parenterally, can be administered in therapeutic dosages in conventional vehicles and pharmaceutical forms, for example, as tablets, capsules, suspensions, solutions, injectables and the like, which can be prepared in accordance with procedures well known in the art.

What is claimed is:

1. A compound selected from the group consisting of a compound of the formula

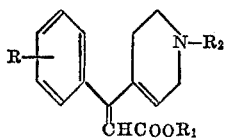

and the therapeutically active acid addition salts thereof wherein R is a member selected from the group consisting of hydrogen, halo, lower alkyl, lower alkoxy and trifluoromethyl; $R_1$ is a member selected from the group consisting of hydrogen and lower alkyl; and $R_2$ is a member selected from the group consisting of lower alkyl, phenyl-lower alkyl and substituted phenyl-lower alkyl in which the substituent is selected from the group consisting of lower alkyl, lower alkoxy, halo, and trifluoromethyl.

2. 1,2,5,6-tetrahydro-1-lower alkyl - β - phenyl-4-pyridineacrylic acid.

3. 1,2,5,6-tetrahydro-1-methyl - β - phenyl-4-pyridineacrylic acid.

4. Lower alkyl 1,2,5,6-tetrahydro-1-lower alkyl-β-phenyl-4-pyridineacrylate.

5. Ethyl 1,2,5,6-tetrahydro-1-methyl - β - phenyl-4-pyridineacrylate.

References Cited

Mironov et al.: Chem. Abstracts, vol. 62, par. 13,017, May 1965.

HENRY R. JILES, *Primary Examiner.*

A. L. ROTMAN, *Assistant Examiner.*

U.C. Cl. X.R.

260—297, 999

UNITED STATES PATENT OFFICE
CERTIFICATE OF CORRECTION

Patent No. 3,426,030                                  February 4, 1969

Vasken Paragamian

It is certified that error appears in the above identified patent and that said Letters Patent are hereby corrected as shown below:

Column 2, lines 8 to 14, the formula should appear as shown below:

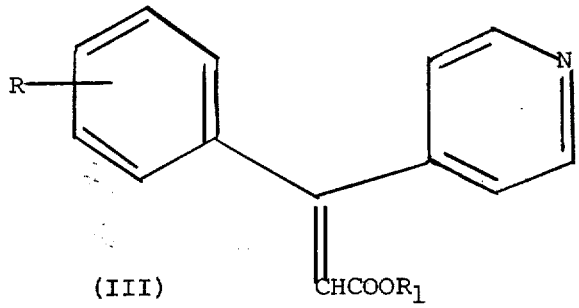

(III)

Column 4, line 1, "form" should read -- from --. Column 5, line 3, "oserved" should read -- observed --.

Signed and sealed this 17th day of March 1970.

(SEAL)
Attest:

EDWARD M. FLETCHER, JR.                          WILLIAM E. SCHUYLER, JR.
Attesting Officer                                       Commissioner of Patents